United States Patent [19]
Carlson

[11] Patent Number: 4,953,145
[45] Date of Patent: Aug. 28, 1990

[54] ACTIVE PHASE QUIETING TARGET HIGHLIGHT DETECTOR

[75] Inventor: Gerrard M. Carlson, Maple Grove, Minn.

[73] Assignee: Honeywell Inc., Minneapolis, Minn.

[21] Appl. No.: 252,221

[22] Filed: Sep. 30, 1988

[51] Int. Cl.$^5$ .............................................. H04B 1/00
[52] U.S. Cl. .................................... 367/138; 367/135; 367/12; 367/901
[58] Field of Search ................. 367/12, 125, 135, 137, 367/138, 901; 342/159, 194

[56] References Cited

U.S. PATENT DOCUMENTS

| | | | |
|---|---|---|---|
| 3,353,146 | 11/1967 | Vartanian | 367/135 |
| 3,618,007 | 11/1971 | Anderson | 367/125 |
| 3,622,963 | 11/1971 | Sage | 367/123 |
| 3,750,152 | 7/1973 | Waful | 367/125 |
| 4,204,281 | 5/1980 | Hagemann | 367/125 |
| 4,532,515 | 7/1985 | Cantrell et al. | 342/194 |

Primary Examiner—Thomas H. Tarcza
Assistant Examiner—Daniel T. Pihulic
Attorney, Agent, or Firm—John G. Shudy, Jr.

[57] ABSTRACT

An active phase quieting target highlight detector using phase and magnitude detection. In contrast to classical magnitude-only detection schemes, the present invention, by combining phase detection, can discriminate sets of spatially-ordered highlights due to a target, from clutter or multipath echoes, along with nonsmoothed magnitude or envelope detection, that can better discriminate target structure due to reception of echoes from shorter active pulses. False target detection and multipath detection are reduced while detection or target structure is retained by the time domain detection scheme of the invention.

18 Claims, 10 Drawing Sheets

ACTIVE PHASE QUIETING TARGET HIGHLIGHT DETECTOR

BACKGROUND OF THE INVENTION

The present invention pertains to target detection and particularly to active sonar target detection. More particularly, the invention pertains to active sonar target detection with phase quieting.

In the related art, detection with active sonar in targeting is typically done by magnitude thresholding. Coherent receivers are used in beam-forming; but phase information, which is available with electronically steered beam sets, is not fully utilized in the target detection process.

The capabilities of detection systems to detect, localize and track submarines and other submerged vehicles is a great strategic significance. In recent years, many advances in naval technology have resulted in the development of acoustically quieter submarines, in that they radiate less and reflect less sound energy than their predecessor submarines.

The use of a sonobuoy and a torpedo to detect and track a potentially hostile submarine employs both active and passive acoustic detection. The choice of one detection mode depends on strategic factors as well as the magnitude of radiated noise of the submarine in question. For instance, if a potential target produces no measurable radiated signal in the sonar receiver, then it becomes necessary to involve active detection processing, that is, to acoustically illuminate the ocean to find the potential target.

Active acoustics will play a greater role as quieter submarines evolve. Future active sonar detection systems will need to be maximally sensitive and accurate. Utilizing both the magnitude and the phase of the acoustic return signal is important in meeting such need of more effective detection.

SUMMARY OF THE INVENTION

The present invention utilizes the magnitude and phase of the acoustic return signal for improved detection. During the return of an acoustic target echo, the random fluctuations in the phase signature quiet down noticeably and predictably. This phenomenon is referred to as "phase quieting." The phenomenon allows phase to be good indicator of the presence of a target in addition to a provider of steering and bearing information for tracking purposes.

Targets usually consist of sets of spatially ordered highlights, whereas non-target scatterers tend to lack order and tend to appear in random orientations. As such, the returned acoustic phase signature from a target becomes quiet due to a momentarily stable wavefront. The incoherent addition of random scatterers (commonly called reverberation or clutter) results in a noticeably unstable phase signature. Thus a target is distinguished from a non-target by the quietness present in the measured phase signature.

Two observations explain why the phase signature provides additional information over the classic magnitude detection scheme. First, the amplitude characteristics of the reverberation echo are not always Gaussian. Second, the correlation characteristics of the reverberation process are not the same as those of the background at all ranges. The usual assumption of a stationary white Gaussian condition may not apply and, thus, there is reason to believe that phase can enhance the detector performance. In addition, multiple ray path propagation (i.e., multi-path) tends to produce a phase signature lacking stability in all but the direct path echo. Such differences in phase characteristics enable the phase detector to discriminate the true target signature from "ghost" target signatures.

The present invention combines differential phase information with amplitude information to result in a reliable coherent target highlight detector in active sonar that is much improved over existing technology. The measured improvement is revealed by reduced false alarm rates and an increased detection index.

DESCRIPTION OF THE PREFERRED EMBODIMENT

Figure 1:
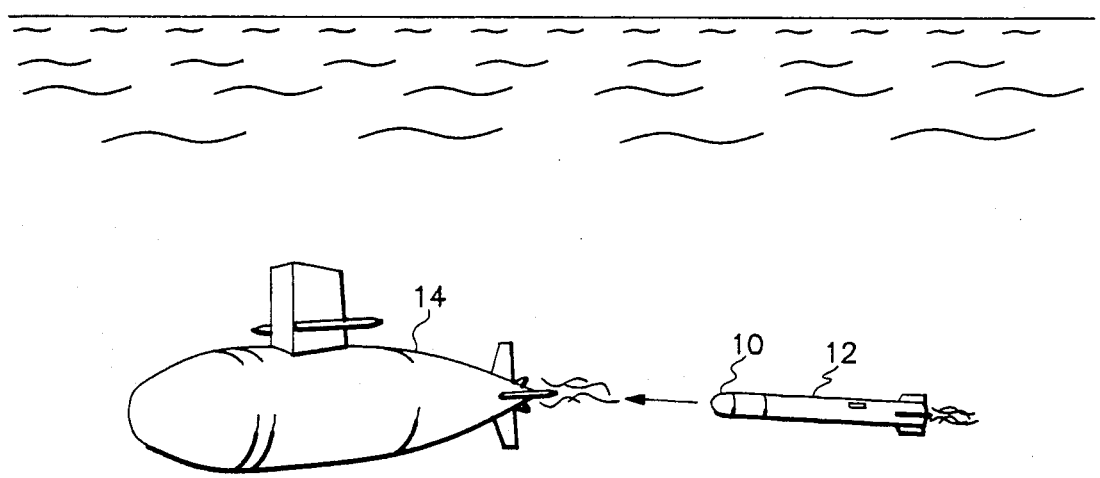
FIG. 1 is a pictorial of a situation wherein the invention is applicable.

FIG. 1 is a pictorial of the situation utilizing an application of the present invention. Torpedo 12 encompasses invention 10 in detection of target 14, e.g., a submarine. The conditions for such detection incorporate active acoustics having narrow and quasiharmonic pulses transmitted, resulting in good resolution of the target 14 structure within the near to intermediate range.

Figure 2:
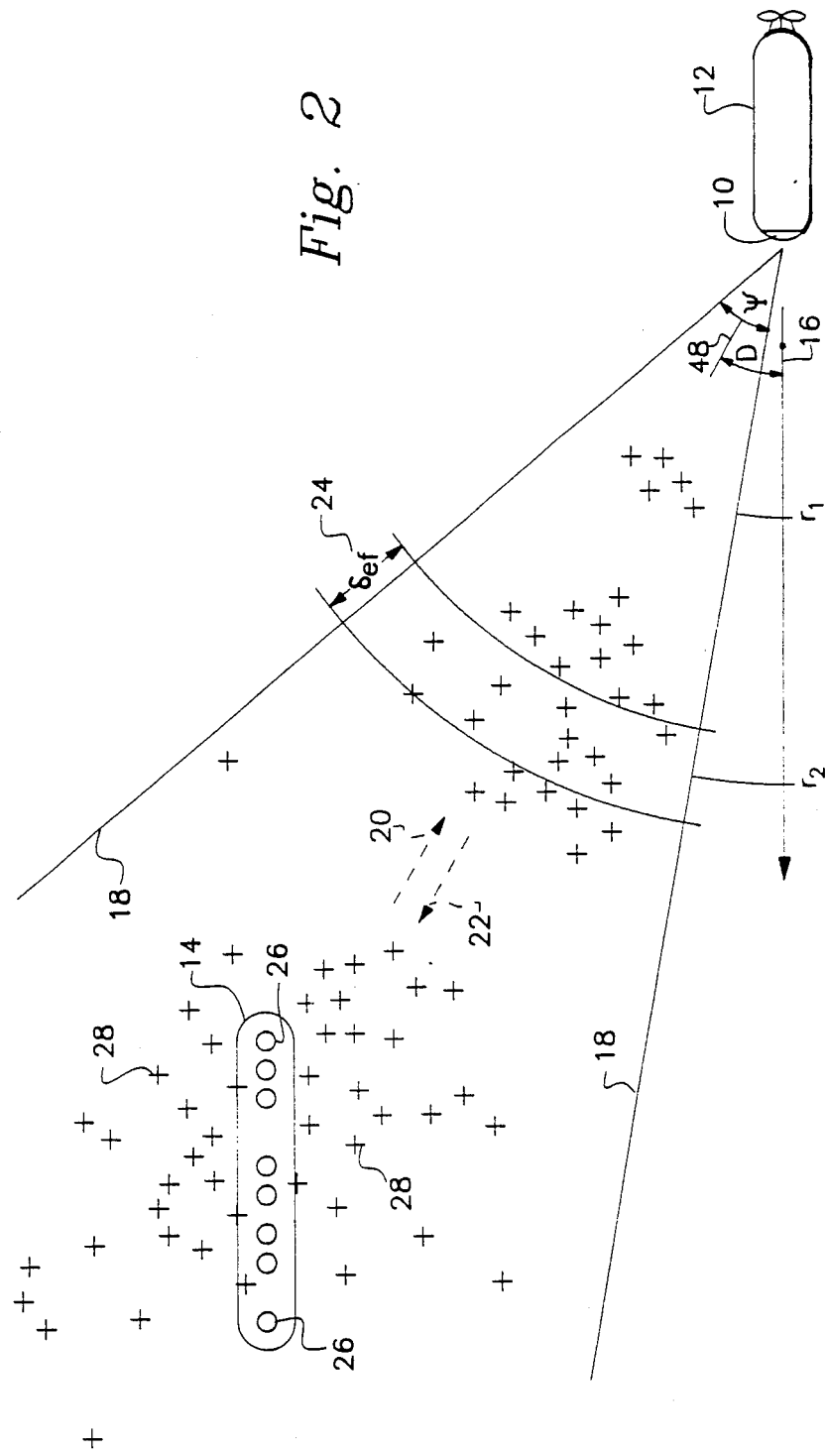
FIG. 2 is a top view of a horizontal slice through the ocean incorporating the target and detector.
Figure 4:
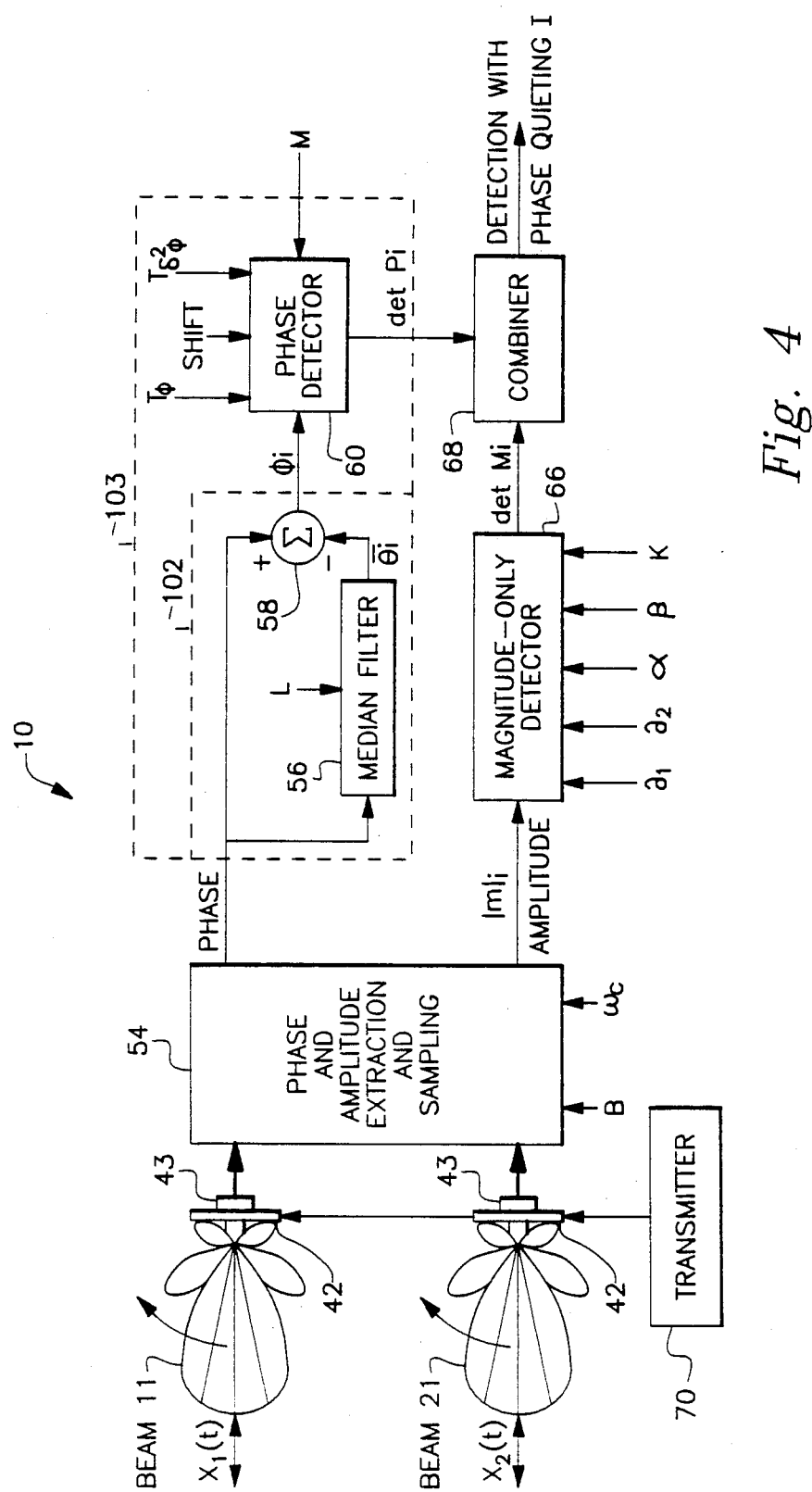
FIG. 4 is a block diagram of the invention.

The present invention 10 utilizes phase information which is available from electronically steered beam sets 11 and 21, shown in FIG. 4, in the detection process. This added information provides a means for better discriminating target 14 highlights 26 from non-target highlights 28 as shown in FIG. 2. The phase data $\theta_i$ combined with magnitude information $|m|_i$ results in a better and more robust target detector 10 (as shown in FIG. 4).

The instantaneous phase is the differential angle $\theta_i$ of a pair of received phase beams 11 and 21 in FIG. 4. This data stream directly feeds an estimator and subtractor 58. The estimator is actually implemented as a median filter 56. Output $\phi_i$ of subtractor 58 is used by phase detector 60 to generates measurements of instantaneous "phase jitter" $|\phi_i|$ and local phase variance $\sigma^2_{\phi i}$ over an appropriate interval of time. The phase jitter $|\phi_i|$ and phase variance $\sigma^2_{\phi i}$ are then separately thresholded by comparators 62 and 64, respectively, of FIG. 7. When the phase jitter $|\phi_i|$ and variance $\sigma^2_{\phi i}$ are both less than required detection thresholds $T_\phi$ and $T_{var.}$ (i.e., $T\sigma^2_{\phi i}$), a phase detection binary signal $detP_i$ is generated. This binary signal is the output of phase detector 60.

Output $detM_i$ of magnitude detector 66 is fed to combiner 68 where, in the simplest case, phase quieting detection results from performing the logical AND function on the outputs from magnitude detector 66 and phase detector 60.

FIG. 2 shows the top view of a horizontal slice through the ocean incorporating torpedo 12 and target 14. Target 14 consists of a set of spatially ordered highlights 26. Line 16 represents the heading of torpedo 12. Lines 18 indicate the outline, like a field of view, of the main lobe 50 (FIG. 3b) of transmitted acoustic beam 20 and reflected acoustic beam 22. A single pulse 24 in direction 20 is sent out by transmitter 70 (shown in FIGS. 4 and 8) in torpedo 12 and a single echo is detected by a receiver in torpedo 12. Transmitted pulse 24 is resent after the return of reflected pulse 24. Pulses 24 are quasiharmonic and relatively short in time. $\sigma_{ef}$ represents the effective transmitted pulse width. $\psi$ represents a sector of acoustically illuminated water or an angle of spread of the cone, as indicated by lines 18, of main lobe 50 of pulse 24 in direction 20 from transmitter 70. "D" indicates the direction or mechanical angle in degrees between acoustic axis 48 and torpedo heading 16. Transmitted signals 24 are scattered at points 26 and 28 prior to return. Points 26, represented by "O"'s, are target scatterers and points 28, represented by "+"'s, are reverberation scatterers (i.e., clutter). Points 26 are spatially-ordered highlights that reveal target or submarine 14.

Figure 3A:
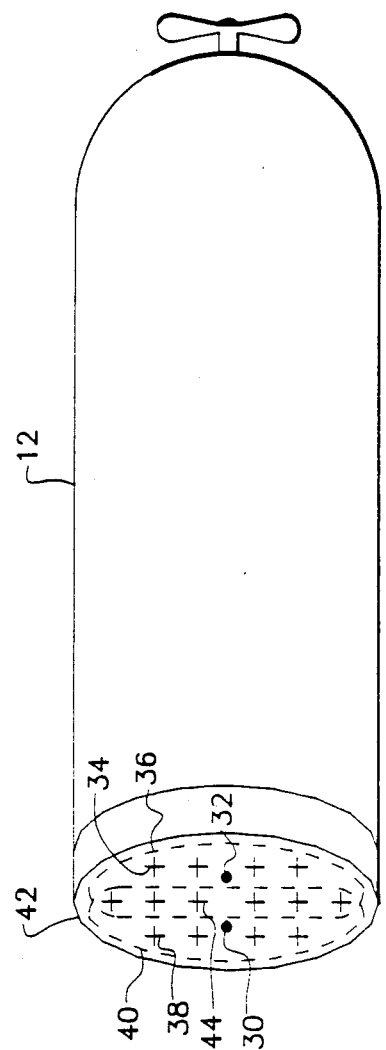
FIG. 3a shows the electrical origin of the beams in a circular plane array.

FIG. 3a reveals the electrical reception and origin of the right horizontal beam and the left horizontal beam having effective phase centers 30 and 32, respectively. However, the transmission may be made as one beam having a phase center between centers 30 and 32, and utilizing some or all of the transducer elements. The received beams remain as described with centers 30 and 32. System 10 utilizes monostatic active sonar. Circular plane array 42 contains a plurality of transducer elements, such as elements 34 and 38. FIG. 3a illustrates 14 elements. The distance between phase centers 30 and 32 may be represented by "s" which is the spacing of the effective phase centers 30 and 32. A dotted line encircles set 40 of transducer elements, including elements 38 and 44, that participate in the transmission (if two beams are utilized) and reception of the right horizontal beam. A dashed line encircles set 36 of transducer elements, including elements 34 and 44, that participate in the transmission (if applicable) and reception of the left horizontal beam. Sets 40 and 36 overlap having elements in common, such as element 44. Likewise, beams 11 and 21 overlap. Elements of an array are timed individually in transmission and receipt of the beams to provide the desired or required effective direction D of beams 11 and 21. Transducer elements of set 40 such as element 38 may be designated individually as $v_1$ where $1=1,2, \ldots N$ and N equals the total number of elements in set 40. Transducer elements of set 36 such as element 34 may be designated individually as $w_m$ where $m=1,2, \ldots N$ and N equals the total number of elements in set 36.

Mathematically, right beam 11 may be represented as $X_1(t) = n\Sigma a_n \cdot V_n[t - d_1(n)]$ where "t" is the time, "d" the time delay, and "a" is for a given beam direction a fixed value weighting of the output of the element producing $v_n$. Similarly, the left beam may be represented as $X_2(t) = m\Sigma a_m \cdot w_m[t - d_2(m)]$ where t is time, "$d_2$" the time delay, and "a" is the signal weighting of the output of the element producing $w_m$. For a beam to "look" in another direction the a and d coefficient weighting values are changed accordingly. The delay d is different for each transducer element, relative to the other elements, for a given effective direction of a beam. The return of the beams have acoustic pressure signatures that convert the return echo into electrical transducer outputs. These outputs are summed in the manner noted above for $X_1(t)$ and $X_2(t)$.

Figure 3B:
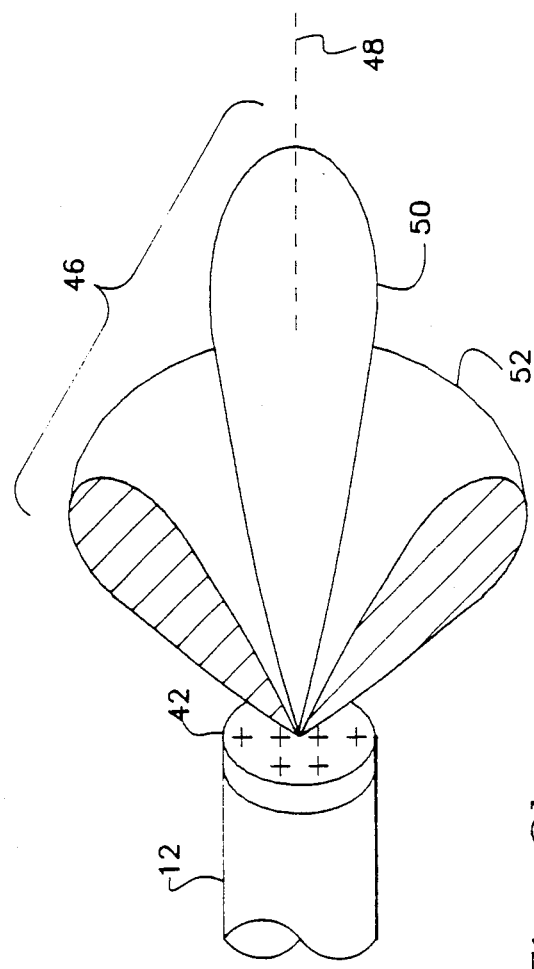
FIG. 3b is a view of the lobes of a beam from a circular plane array.

FIG. 3b shows a view of beam 46 emanating along acoustic axis 48 from circular plane array 42. Beam 46 has, as components, main lobe 50 alined with acoustic axis 48 and side lobe 52 peripheral to main lobe 50. Beam 46 represents beams 11 and 21, whether received or transmitted, by array 42.

FIG. 4 is a block diagram of phase quieting detector 10. Transmission and receipt of right and left beams 11 and 21, respectively, are initially by array 42. The received echo signals enter phase and amplitude extraction and sampling unit 54 which is described in greater detail in FIG. 5. Interface electronics 43 (of FIGS. 4, 5, and 8) inter-connect antenna array 42 with unit 54 and transmitter 70. Interface electronics 43 is ordinary and well-known in the art.

Figure 5:
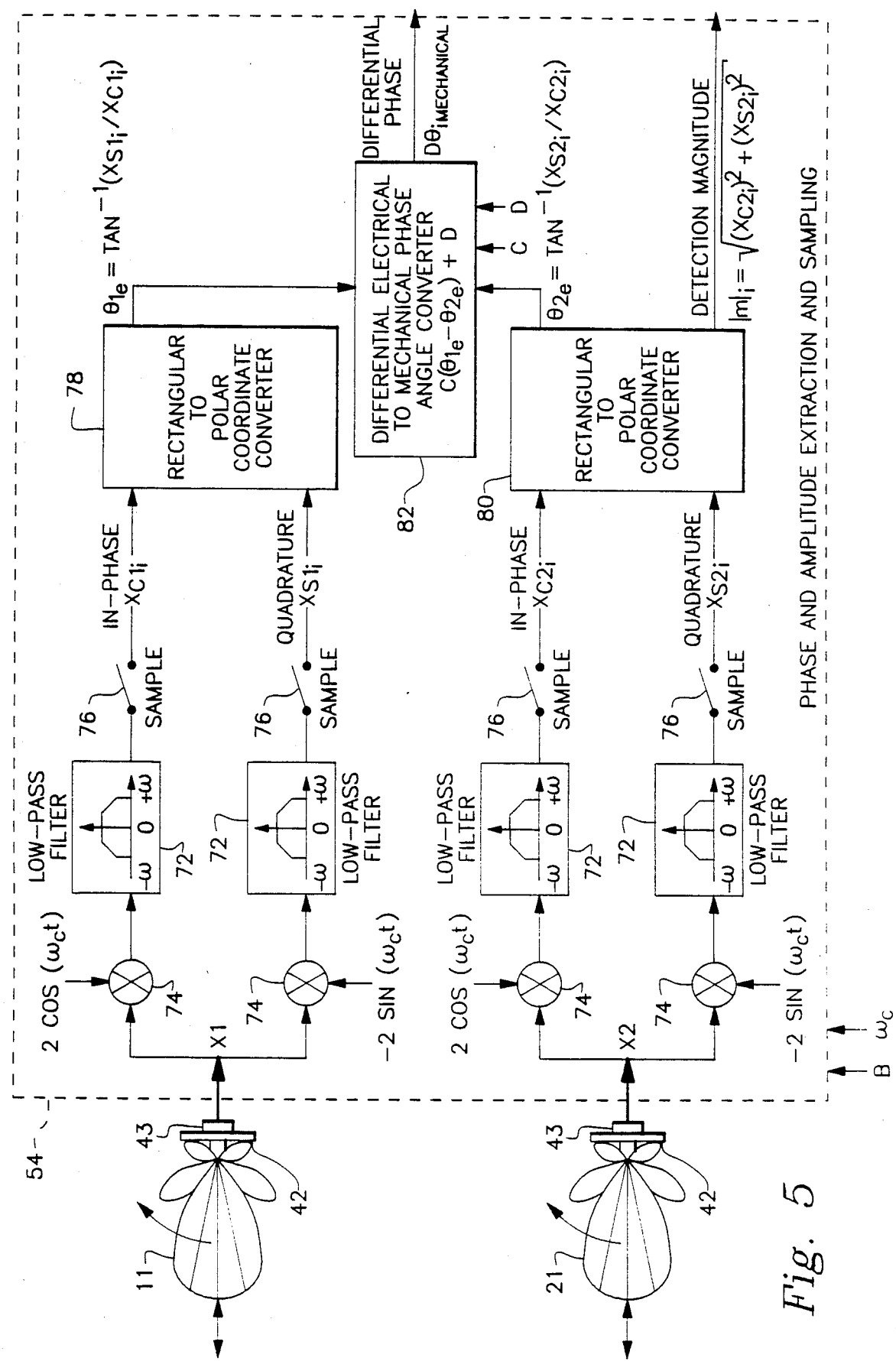
FIG. 5 is a diagram of the phase and amplitude extraction and sampling portion of the invention.

"B" is the bandwidth of device 54 and is the frequency at which the samplers operate. In the low pass filter, $\omega = B/2$ is the baseband analog cutoff frequency. "$\omega_c$" is the demodulator center frequency of device 54. Frequency $\omega_c$ is entered into the inputs via trignometric function transformations and multipliers 74. FIG. 5 shows device 54 functioning for the i th sample. The signals are filtered prior to their sampling. In-phase and quadrature signals from respective low pass filters 72 are sampled by samplers 76. The "i"th samples of processed in-phase and quadrature signals, which represent orthogonal components, ultimately from beams 11 and 21, are fed into rectangular-to-polar coordinate converters 78 and 80, respectively. The angles of signals from the output of converter 80 is subtracted from the output of converter 78 in differential to mechanical phase angle converter 82. The operation of converter 82 is represented by "$C(\theta_{1e} - \theta_{2e}) + D$" wherein $\theta_{1e}$ and $\theta_{2e}$ are the outputs of converters 78 and 80, respectively. "C" is a sensitivity constant which is a function of the effective spacing "s" of phase centers 30 and 32 of beams 11 and 21 and a function of the wavelength of the transmitted signals which is a function of $\omega_c$, "D" is the mechanical angle offset of the center axis to the beam cone to the heading of torpedo 12. C and D are inputs to converter 82. The output of converter 82 is the differential phase which is designated by $D\theta_{imechanical}$.

The other output of converter 80 is the Pythagorean sum of the magnitudes of the in-phase and quadrature signals to converter 80. The lower output of converter 80 is the detection magnitude for the given sample i which is designated by $|m|_i$. $|m|_i$ is the "i"th sample of the instantaneous nonsmoothed envelope of the received signal.

Figure 6A:
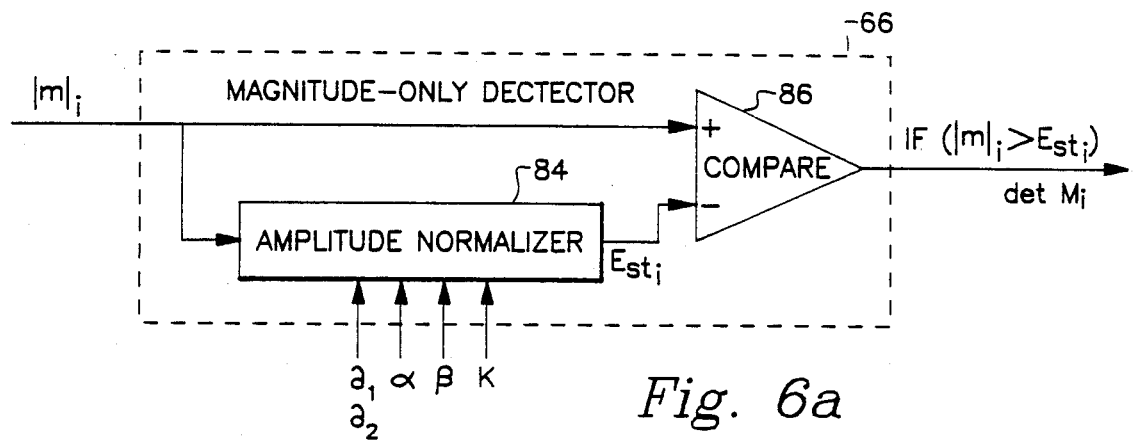
FIG. 6a is a diagram of the magnitude-only detector.
Figure 6B:
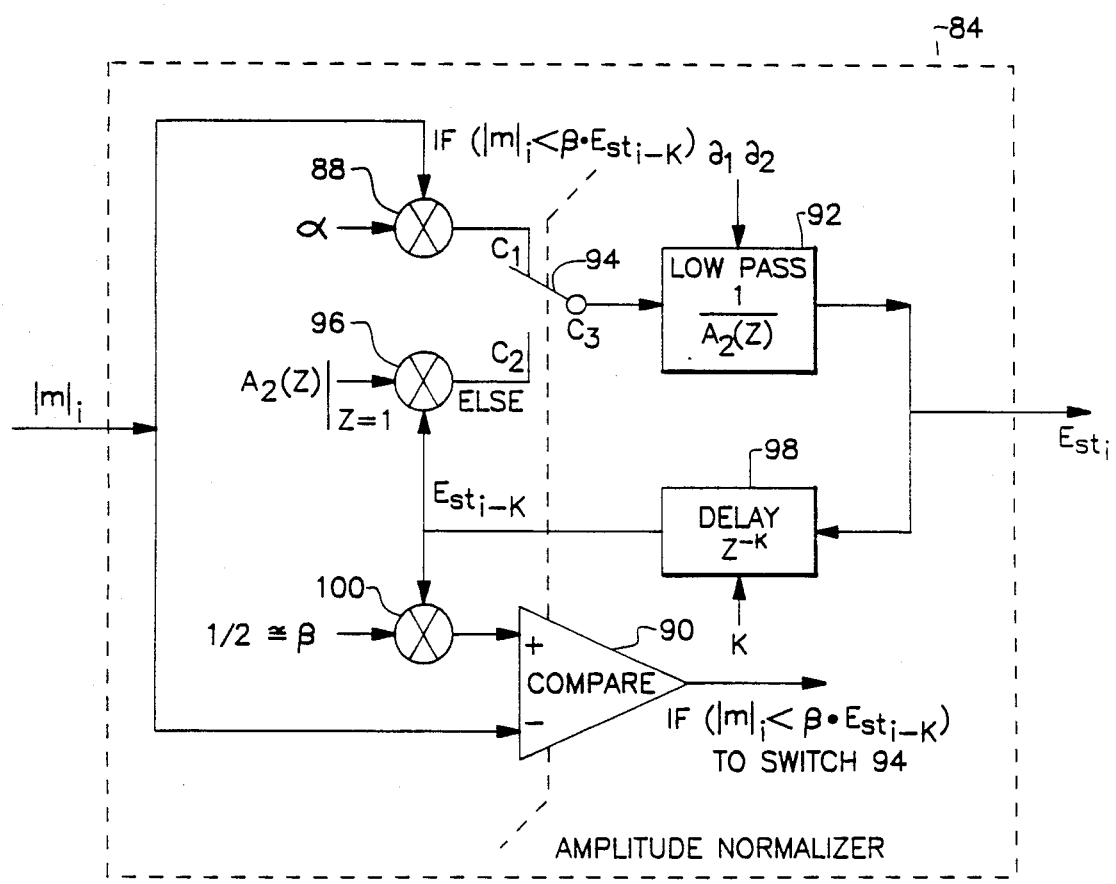
FIG. 6b is a diagram of the amplitude normalizer.

The lower output $|m|_i$ of converter 80 enters magnitude-only detector 66. In detector 66, the $|m|_i$ signal goes to comparator 86 and amplitude normalizer 84 shown in FIG. 6a. FIG. 6b reveals amplitude normalizer 84 in detail. Input $|m|_i$ goes to multiplier 88 and comparator 90. Also going to multiplier 88 is "$\alpha$" which ultimately scales the output of low pass filter 92 so that the estimate $Est_i$ will yield the required constant false alarm rate (CFAR). CFAR is the minimum instantaneous signal to background noise ratio required for magnitude-only detection at that instant time. The output of multiplier 88 goes to low pass filter 92 if $|m|_i$ is less than $\beta \cdot Est_{i-k}$ as determined by switch 94 and comparator 90 in FIG. 6b. Factors $a_1$ and $a_2$ are coefficients to the low pass filter having the function $A_2(Z) = 1 - a_1 Z^{-1} - a_2 Z^{-2}$. If $|m|_i$ is greater than $\beta \cdot Est_{i-k}$ then switch 94 rapidly switches to "else" which is the output of multiplier 96. Switch 94 is controlled by the output of comparator 90. A comparison of inputs by comparator 90 causes switch 94 to select either input $C_1$ or $C_2$ by the following rule: $(|m|_i < \beta \cdot Est_{i-k})$, then $C_3 = C_1$, or else $C_3 = C_2$. The switch of the input of filter 92 to the output of multiplier 96 is made in order that target energy be excluded from the background estimate. The background estimate (i.e., the output of normalizer 84) becomes locked until the return pulse energy from the target is passed and thus detector 66 detects when the minimum CFAR signal to noise criterion is met. The threshold detect $T_d$ is equal to $\alpha/A_2(1)$ which is equal to the CFAR ratio. $A_2$ is the second order denominator polynomial of the low pass filter, and $A_2(1)$ is $1-a_1-a_2$ where $Z=1$ and $Z$ is the Z-transform operator for unit delay. The input $A_2(Z)|Z=1$ represents 1/Direct Current Gain of Filter 92. The D.C. gain of filter 92 is equal to $1/A_2(1)$ which is equal to $1/(1-a_1-a_2)$. The other input to multiplier 96 is $Est_{i-k}$ which is the output of delay 98 having the factor $Z^{-k}$. The input k to delay 98 sets the delay of $Est_i$ by k steps. The number k is a function of the order (approximately) of the width of return pulse 24 that significantly depends on the transmitted pulse 24 width. Output $Est_{i-k}$ from delay 98 goes to multiplier 100. Input $\beta$ also goes to multiplier 100. $\beta$ is a value of approximately 0.5 which ultimately effects selecting an acceptable amount of signal background magnitude jitter, which if it is less than $\beta \cdot Est_{i-k}$ then the input signal to normalizer 84 is tracked in that switch 94 connects the output of multiplier 88 to the low pass filter. The output $\beta \cdot Est_{i-k}$ from multiplier 100 goes to comparator 90 along with $|m|_i$ from converter 80. The output of comparator 90 causes switch 94 to switch from the output of multiplier 88 to the output of multiplier 96 only if $|m|_i$ is equal to or greater than $\beta \cdot Est_{i-k}$; otherwise, switch 94 returns to the output of multiplier 88.

The resultant output $Est_i$ from amplitude normalizer 84 goes to comparator 86. $Est_i$ is compared with $|m|_i$ from converter 80 resulting in output $detM_i$ from comparator 90. Output $detM_i$ is binary and is a "1" if the target signal to background noise ratio exceeds the CFAR ratio; otherwise, the output of comparator 86 and magnitude-only detector 66 is a "0". That is, $detM_i$ is equal to "1" if $|m|_i > Est_i$ or otherwise det $M_i$ is equal to "0".

The differential phase or $D\theta_{imechanical}$ or $\theta_i$ goes to instantaneous phase jitter indicator 102 of phase detector 103. Input $\theta_i$ goes to median filter 56 which generates the local median $\theta_i$ of the $\theta_i$. Median filter 56 is a known device in the art. Filter 56, at one time, holds a given number L of values or samples, including $\theta_i$, and selects the median value. The number of samples held and considered by filter 56 is the length L of the window of filter 56 and is determined by input L to filter 56. When a new value enters filter 56, the oldest value is eliminated and the next median value is selected from the new set of values. The median value $\theta_i$ is subtracted from the instantaneous phase value $\theta_i$ by subtractor 58 resulting in an output $\theta_i$ which is an instantaneous phase jitter value.

Instantaneous phase jitter value $\phi_i$ goes to phase detector 60. Value $\phi_i$ goes to absolute-value converter 104. From converter 104 signal $|\phi_i|$ goes to summation processor 106 and comparator 62. Signal $|\phi_i|$ is processed into $$\phi_i = \sum_{J=0}^{M-1} \phi_{i+j}^2$$

variance window length setting for processor 106. The output of processor 106 is shifted according to the amount of signal shift entered into shifter 108. From shifter 108 comes the phase variance estimate $\sigma^2_{\phi i}$ which is fed to comparator 64. $T_{var}$ is a variance threshold connected to an input of comparator 64. If $T_{var}$ is greater than $\sigma^2_{\phi i}$ then the output of comparator 64 is a binary "1", in all other cases, the output is a binary "0".

$T_\phi$ to phase detector 60 goes to an input of comparator 62 to be compared with $|\phi_i|$. If $T_\phi$ is greater than $|\phi_i|$, then the output of comparator 62 is a binary "1". In all other cases, the output is a binary "0". The binary outputs of comparators 62 and 64 go to AND gate 112, which has a signal output $detP_i$. The output of gate 112 is a binary "1" if $T_{var}$ is greater than $\sigma^2_{100\ i}$ and $T_\phi$ is greater than $|\phi_i|$; in all other cases the output of gate 112 is a binary "0". The binary "1" $detP_i$ signal indicates that the instantaneous phase jitter and phase variance are below certain set thresholds thus indicating the likelihood of a target. The output $detP_i$ signal of detector 60 goes to combiner 68 which contains AND gate 114. The output $detM_i$ signal of detector 66 goes to combiner 68. AND gate 114 combines both $detM_i$ and $detP_i$ and outputs the PhsQ-I (phase quieting I) signal. If both $detP_i$ and $detM_i$ signals are binary "1"'s, then the output signal PhsQ-I is a binary "1" thereby indicating detection of a target; in all other cases, the output signal is a binary "0" thereby indicating no detection of a target.

Figure 7:
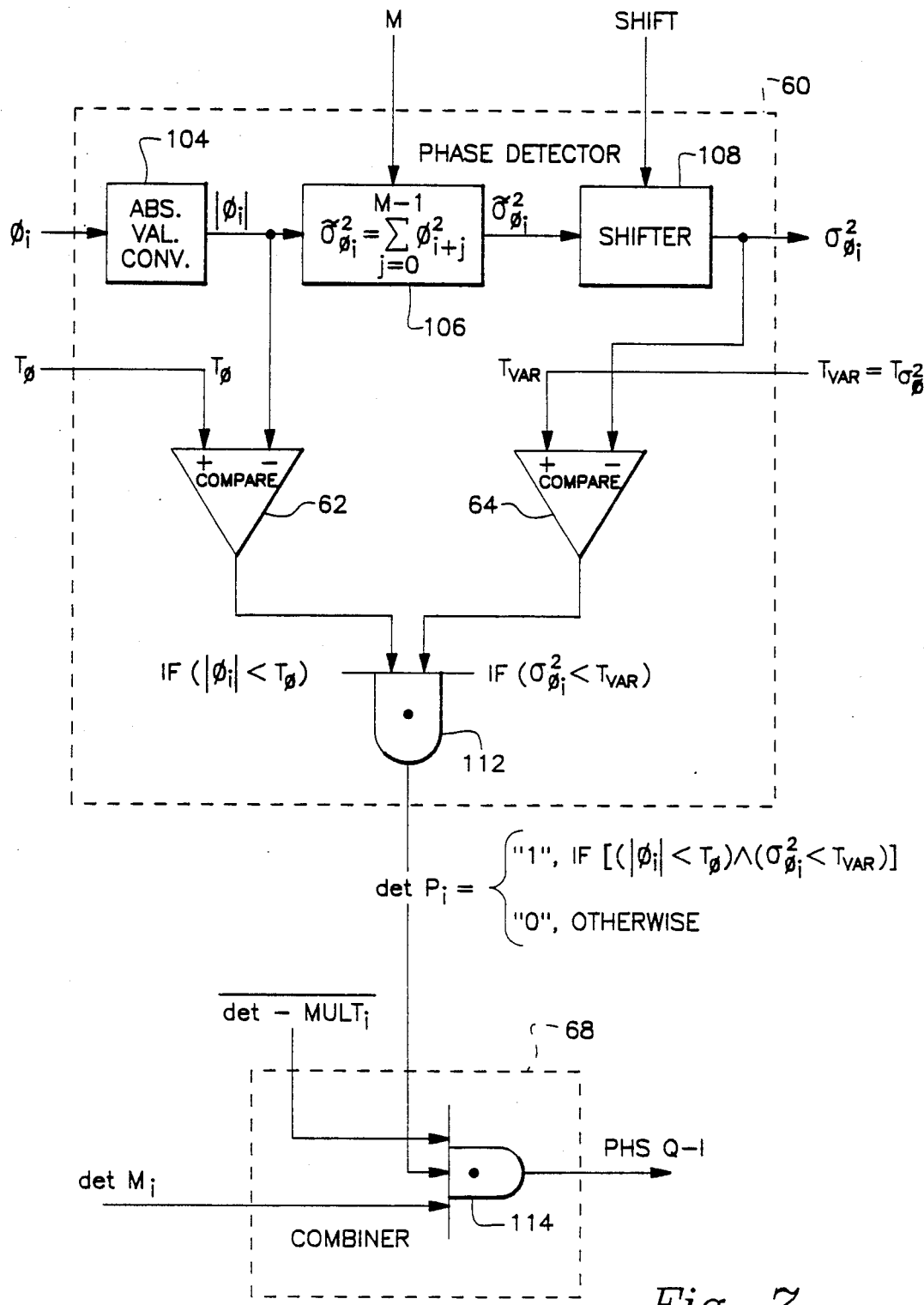
FIG. 7 is a diagram of the phase detector and combiner.

As FIG. 7 is applied to FIG. 4, the input line "$\overline{detulti}/i$" is at logic "1" so that (PhsQ-I)=$(detM_i) \cdot (detP_i)$. As applied to embodiment 120 in FIG. 8, the input line "$\overline{detulti}/i$" is supplied from the output of multipath detector 124, so then in FIG. 7, (PhsQ-I)=$(detP_i) \cdot (detM_i) \cdot ("\overline{detulti}/i")$.

Figure 8:
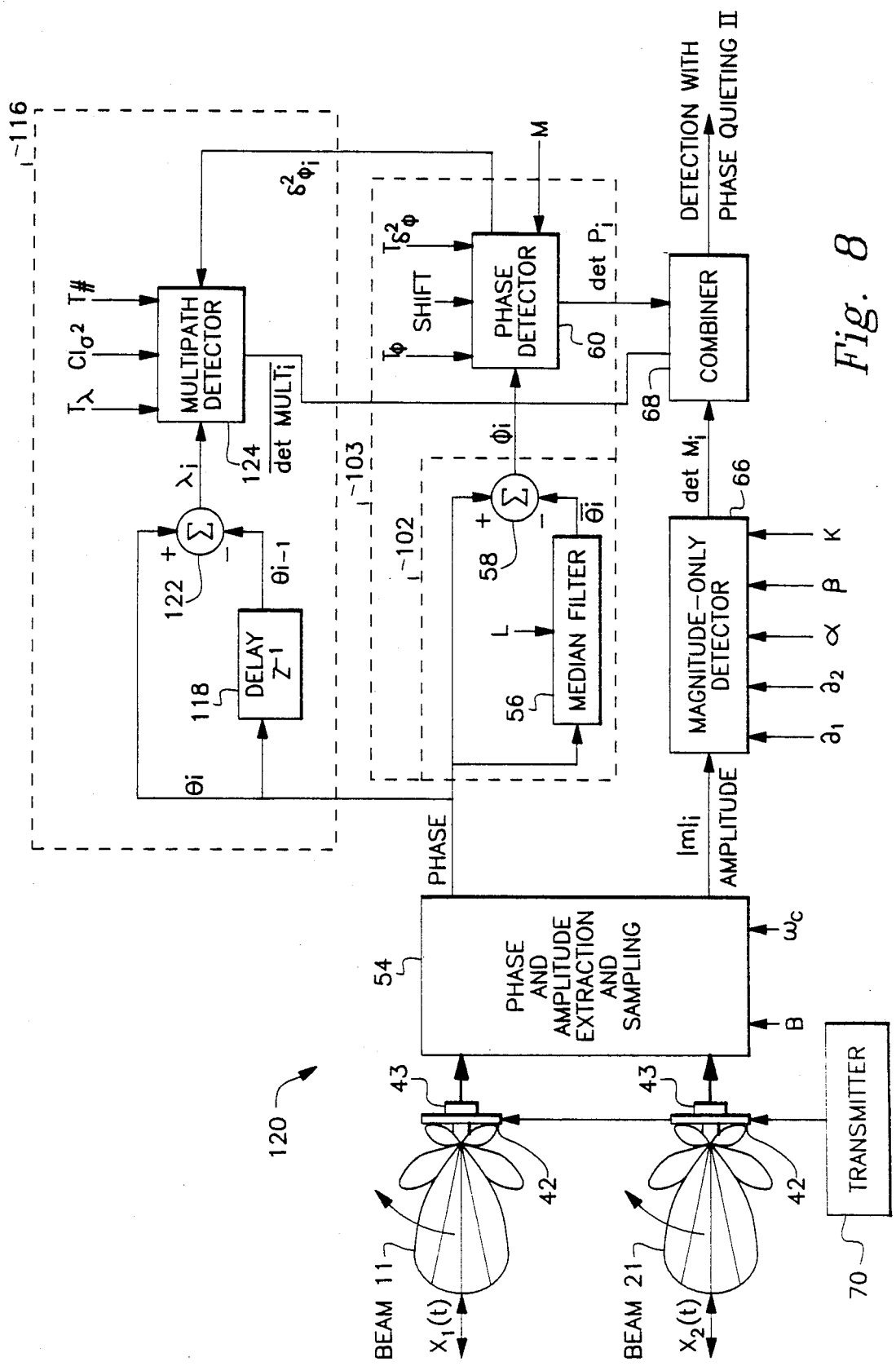
FIG. 8 is a block diagram of another embodiment of the invention.

FIG. 8 discloses another embodiment of the invention. FIG. 8 is similar to FIG. 4 except that it has multipath detector 116 as an added feature for more discriminating target detection. The instantaneous phase signal $\theta_i$ enters delay 118 and subtractor 122. Delay 118 shifts $\theta_i$ by one sample resulting in signal $\theta_{i-1}$. Delay 118 is a memory cell shift register. Subtractor 122 subtracts signal $\theta_{i-1}$ from signal $\theta_i$, resulting in a measure of adjacent sample phase different $\lambda i$ of the signal so as to gauge the difference between direct path and multipath returns. Multipath returns are typically from the surface or the bottom of the ocean. Multipath returns are not as tightly distributed in time delays as the direct path returns. There is a larger variance in phase signatures of multipath echoes than in direct path echoes.

Figure 9:
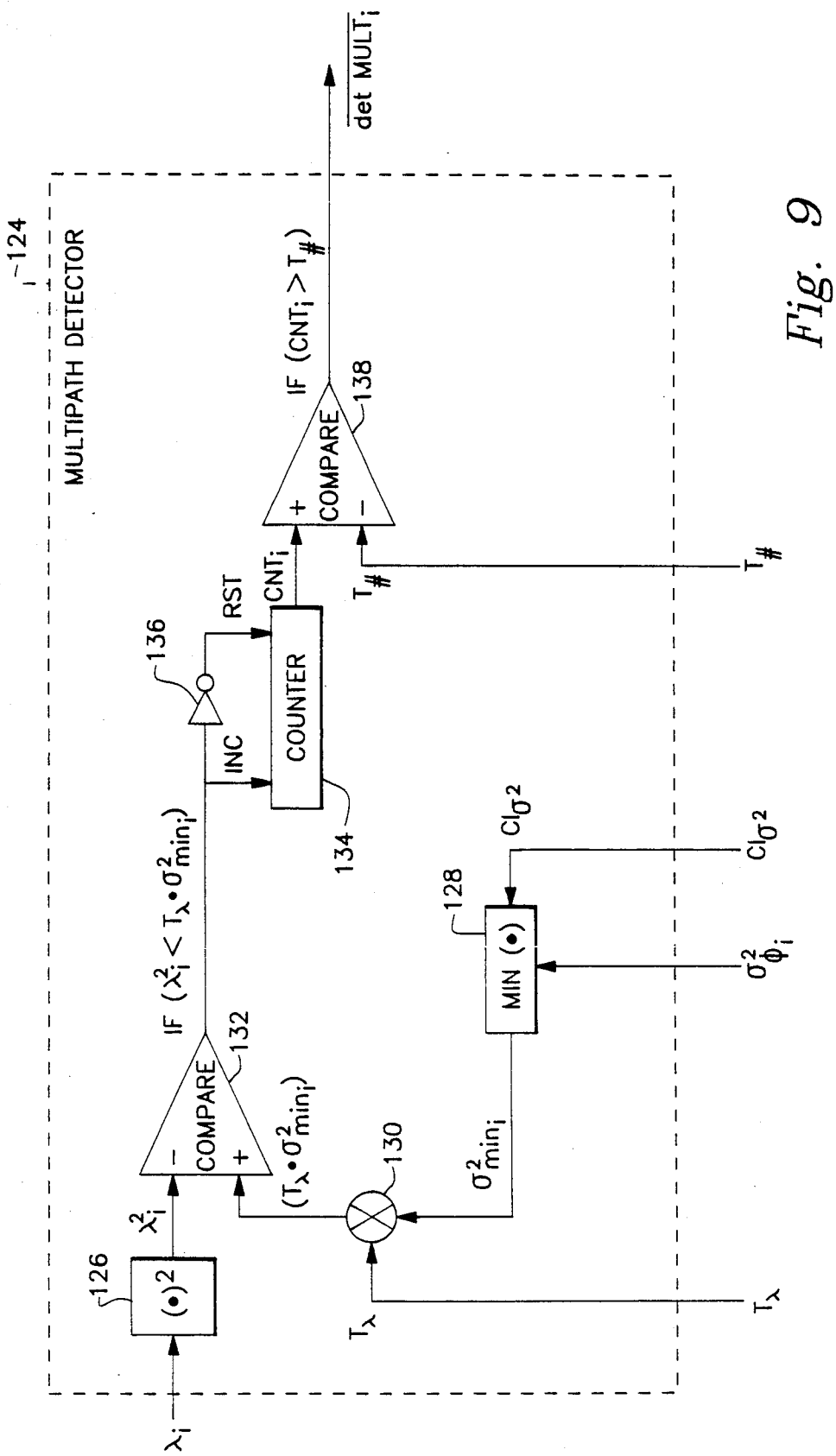
FIG. 9 is a diagram of the multipath detector.

The $\lambda_i$ signal from subtractor 122 goes to squaring function converter 126 of multipath detector 124 as shown in FIG. 9. The phase variance estimate $\sigma^2_{\phi i}$ signal from phase detector 60 goes to minimum value selecting function 128 having a $Cl_\sigma 2$ clamping signal for determining the present minimum variance estimate (thus far from the current echo) coming out of converter 128, which is used to normalize the instantaneous sensitivity of detector 124. $\sigma^2_{\phi i}$ is a sum of squares value over window M. M is on the order of the width of the transmitted pulse. The $\sigma^2_{min}$ signal from converter 128 goes to multiplier 130 which multiplies the minimum variance estimate $\sigma^2_{min}$ the phase by an appropriate threshold signal $T_\lambda$ such that thresholding on the square of the adjacent sample phase difference signal $\lambda_i$ permits detection of the direct path echo and excludes the detection of multipath echoes. Such comparison is performed by comparator 132 of $\lambda^2_i$ and the multiplier 130 output. The output of comparator 132 is a binary "1" if $\lambda^2_i$ is less than $T_\lambda$ multiplied by $\sigma^2_{min}$; in all other cases, the output is a binary "0". The binary "1"'s from comparator 132 are counted by counter 134 via incrementing. If a binary zero comes from comparator 132, indicating the failure of a sample to pass the threshold test for indicating a non-multipath signal, then the binary zero is inverted by inverter 136 and goes on to reset counter 134. The output of counter 134 indicates the total number of continuous sequential indications of a non-multipath signal before a multipath signal indication. The counter 134 output goes to comparator 138. Signal $T_\#$ to comparator 138 is a number indicating the count that must be reached by counter 134 in order for comparator 138 to provide a binary one output. $T_\#$ sets the minimum number of consecutive adjacent sample phase tests that are required to validate a direct path echo. A binary "1" is output of detector 124 if the count is greater than $T_\#$; a binary "0" is output in other cases of comparator 138 inputs. The binary "1" indicating a direct path echo, or a "0" indicating otherwise, is fed to gate 114 of combiner 68. Thus, a phase quieting II detection of a target requires three favorable phase indications and one favorable magnitude indication as described above.

I claim:

1. An active phase quieting target highlight detector comprising:
   signal detection means for reception of an echo signal;
   extraction means, connected to said detection means, for extracting phase and amplitude information from the echo signal;
   magnitude detection means, connected to said extraction means, for processing said amplitude information;
   phase detection means, connected to said extraction means, for processing said phase information, comprising:
      a phase variance indicator connected to said extraction means; and
      a phase detector connected to said phase variance indicator and to said combining means; and
   combining means, connected to said magnitude detection means and to said phase detection means, for combining signals from said magnitude detection means and phase detection means.

2. Apparatus of claim 1 further comprising a multipath detection means, connected to said extraction means, to said phase detection mans and into said combining means, for detecting phase information having multipath return characteristics.

3. Apparatus of claim 2 wherein said multipath detection means comprises:
   a delay circuit connected to said extraction means;
   a subtractor connected to said delay circuit and to said extraction means; and a multipath detector connected to said subtractor, to said phase detection means and to said combining means.

4. Apparatus of claim 3 wherein said multipath detector provides an indication of whether phase-only signals represent a target or not, to said-combining means.

5. Apparatus of claim 1 further comprising a transmitter.

6. Apparatus of claim 5 wherein said signal detection means comprises:
   an antenna element array for perceiving first and second beams of the echo signal having differently located phase centers; and
   an interface connected to said antenna element array, to said extraction means, and to said transmitter.

7. Apparatus of claim 6 wherein said extraction means comprises:
   first multiplier means, connected to said interface, for converting the first beam into a first in-phase echo signal and a first quadrature echo signal;
   second multiplier means, connected to said interface, for converting the second beam into a second in phase echo signal and a second quadrature echo signal;
   first filter means, connected to said first multiplier means, for filtering the first in-phase echo signal and the first quadrature echo signal into a filtered first in-phase echo signal and a filtered first quadrature echo signal;
   second filter means, connected to said second multiplier means, for filtering the second in-phase echo signal and the second quadrature echo signal into a filtered second in-phase echo signal and a filtered second quadrature echo signal;
   first sampling means, connected to said first filter means, for sampling the filtered first in-phase echo signal and the filtered first quadrature echo signal into a sampled filtered first in-phase echo signal and a sampled filtered first quadrature echo signal;
   second sampling means, connected to said second filter means, for sampling the filtered second inphase echo signal and the filtered second quadrature echo signal into a sampled filtered second in-phase echo signal and a sampled filter second quadrature echo signal;
   first rectangular-to-polar coordinate converting means, connected to said first sampling means, for converting the sampled filtered first in-phase echo signal and the sampled filtered first quadrature echo signal into a first phase signal;
   second rectangular-to-polar coordinate converting means, connected to said second sampling means and to said magnitude detection means, for converting the sampled filtered second in-phase echo signal and the sampled filtered second quadratur4e echo signal into a second phase signal and a magnitude signal; and
   phase angle converting means, connected to said first and second rectangular-to-polar coordinate converting means and to said phase detection means, for converting the first and second phase angles into a differential phase signal.

8. Apparatus of claim 7 wherein said phase variance indicator comprises:
   a median selecting means, connected to said phase angle converting means, for periodically selecting a median differential phase angle; and
   a subtracting means, connected to said phase signal converting means and to said median selecting means, for subtracting the median differential phase signal from the differential phase signal to provide a phase variance signal to said phase detector.

9. Apparatus of claim 8 wherein said phase detector evaluates the phase variance signal from the phase variance indicator and determines whether the phase variance signal indicates a target or not.

10. Apparatus of claim 9 wherein said magnitude detection means comprises:
an amplitude normalizer connected to said second rectangular-to-polar coordinate converting means; and
a comparator, connected to said second rectangular-to-polar coordinate converting means, to said amplitude normalizer and to said combining means, for indicating whether the magnitude signal indicates a target or not.

11. Apparatus of claim 10 wherein said combining means is an AND device that outputs a target indication signal if and only if signals from said phase detector and said comparator indicate a target.

12. An active phase quieting target highlight detector comprising:
an antenna of elements;
a phase extraction circuit connected to said antenna;
an amplitude extraction circuit connected to said antenna;
a first sampler connected to said phase extraction circuit;
a first converter connected to said first sampler;
a second sampler connected to said amplitude extraction circuit;
a second converter connected to said second sampler;
a third converter connected to said first and second converters;
a phase processing circuit, connected to said third converter, comprising:
a median filter connected to said third converter;
a subtractor connected to said median filter and to said third converter; and
a phase detector connected to said subtractor and to said combiner;
a magnitude-only detector connected to said second converter; and
a combiner connected to said phase processing circuit and to said magnitude-only detector.

13. Apparatus of claim 12 further comprising a phase path detection circuit connected to said third converter, to said phase detector, and to said combiner.

14. Apparatus of claim 13 wherein said phase path detection circuit comprises:
a delay circuit connected to said third converter;
a subtractor connected to said delay circuit and to said third converter; and
a multipath detector connected to said subtractor, to said phase detector and to said combiner.

15. Apparatus of claim 14 further comprising a transmitter connected to said antenna.

16. A method for detecting a target through active phase quieting, comprising:
detecting at least two beams of a return echo signal;
extracting phase signals from said beams; extracting amplitude signals from said beams; detecting phase variance of the phase signals;
determining whether the phase signals represent a target, based on the phase variance;
detecting magnitude of the amplitude signals; determining whether the amplitude signals represent a target, based on the magnitude; and
determining that a target is detected if and only if the phase signals represent a target and the amplitude signals represent a target.

17. Method of claim 16 further comprising: determining whether the phase signals have multiple paths;
determining whether the phase signals represent a target based on a lack of multiple paths; and
determining that a target is detected if and only if the phase signals, based on a lack of multiple paths and on the phase variance, and the amplitude signals, based on the magnitude, represent a target.

18. Method of claim 3 further comprising transmitting a signal that may result in a return echo signal.

* * * * *